3,652,467
MASTIC ADHESIVE COMPOSITION CONTAINING ROSIN POT RESIDUE OR ITS ZINC SALT OR GLYCOL POLYESTER
Albert R. Bunk, Columbus, Bailey Bennett, Worthington, and David A. Berry, Columbus, Ohio, and Bernard A. Parkin, Jr., Walter H. Schuller, and Ray V. Lawrence, Lake City, Fla., assignors to the United States of America as represented by the Secretary of Agriculture
No Drawing. Filed Feb. 27, 1970, Ser. No. 15,229
Int. Cl. C08d *13/38, 9/12*
U.S. Cl. 260—2.3                                                   12 Claims

ABSTRACT OF THE DISCLOSURE

Mastic adhesive compositions having excellent properties for adhesive applications in the building trades industry, which compositions comprise relative proportions by weight of: 100 parts of reclaim rubber; 50 to 200 parts of a rosin pot residue or its zinc salt or glycol polyester; and a hydrocarbon vehicle for the rubber.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a mastic adhesive composition. More particularly, the invention concerns a mastic adhesive composition containing a reclaim rubber and a rosin pot residue or its zinc salt or glycol polyester.

Mastic adhesive compositions are special types of adhesives which are thick and buttery in consistency and are characterized by their high viscosity. Most mastic compositions contain natural, SBR, or reclaim rubber or blends of these. They may be either latex- or solvent-based. Tackifiers and fillers are widely included therein. These mastic adhesive compositions are used in volume and principally in low-strength adhesive applications. For adhesive applications the composition is applied generally by means of a spatula, notched-trowel, or pressure gun as a coating onto and usually to both surfaces to be bonded. After drying of the coating a contact bond is made. They are useful for adhering floor and wall tile, floor coverings, decorative plastic counter tops, ceiling tile and panels, and in like adhesive applications in the building trades industry. Of importance for their utility is that the mastic adhesive composition possesses special properties. The mastic composition needs to possess a reasonable open or application time, an adequate green tack strength upon contact, and good aging properties, such as retention of its bond strength for a long period. Other desirable properties are adequate lap-shear strength and resistance to static load at an elevated temperature.

Heretofore numerous mastic adhesive compositions have been known. Likewise a number of rosin-derived materials have been used as components in some mastic compositions, such as illustrated by a six-part mastic composition, taught in U.S. Pat. No. 2,985,606, of which one component is a rosin ester and another is a zinc salt of rosin acids. However, even though a number of useful mastic compositions are known, there has continued to be a need for alternative and new and improved mastic compositions containing other rosin-derived materials to provide a selection of mastic compositions offering equivalent and/or improved properties. It is to fulfilling those needs of a prior art that the present invention is directed.

The mastic compositions of the invention comprise relative proportions by weight of: 100 parts of reclaim rubber; 50 to 200 parts of rosin pot residue or a zinc salt or glycol polyester thereof; and a hydrocarbon vehicle for the rubber to provide the composition with a solids content between 40 and 80 percent.

In common with previous mastic adhesive compositions, the mastic compositions of the invention contain reclaim rubber and a hydrocarbon vehicle for the rubber. They also may contain, and generally do contain, additional conventional constituents such as fillers, reinforcing agents, rubber antioxidants, and the like. The rubber imparts body, stability, and some tack to the entire composition, but fails to provide adequate tack properties for the composition unless another tackifying constituent is included.

Reclaim rubber in general is the rubber product resulting from treatment of vulcanized scrap rubber tires, tubes, and miscellaneous waste rubber articles by the application of heat and chemical agents thereto, whereby a substantial "revulcanization" or regeneration of the rubber compound to its original plastic state is effected. The reclaiming is essentially a depolymerization with combined sulfur, filler, and like constituents found in its unreclaimed vulcanized state generally not being removed and continuing to be found in the reclaimed rubber. Whether the reclaim rubber is classified by its reclaiming process or by the nature of the rubber therein and/or type of scrap reclaimed, that reclaim rubber is useful in the mastic compositions of the invention.

A vehicle for dispersing the reclaim rubber is included in the mastic composition. The vehicle can be any of the known hydrocarbon vehicles therefor, such as naphtha fractions or other liquid hydrocarbon fractions, particularly those boiling in the range of 140°–215° F. The vehicle is included in an amount to provide a mastic composition of a solids content between about 40 and 80 percent by weight. Generally the vehicle is included in an amount between 150 to 400 parts by weight per hundred parts of the rubber, and preferably is included in an amount between 200 and 350 phr. of the rubber. The amount also is chosen so as to provide a mastic composition of a desirable and requisite viscosity for the particular mastic adherence application in mind.

Generally and desirably the mastic compositon also includes inorganic fillers to lower its overall cost without appreciable detriment to its physcal properties. Useful inorganic fillers include calcium carbonate, clays, and particularly kaolin clays, finely divided silicon dioxide, carbon black, inorganc fibers such as asbestos fibers, and the like conventional fillers. The fillers may amount to up to 500 parts by weight for each 100 parts by weight of the rubber. Inclusion of larger amounts of filler detrimentally effect the strength of the mastic composition. Generally and preferably the filler is included in an amount between 150 to 400 patrs by weight for each 100 parts by weight of the rubber.

Generally the mastic composition also includes, and also in conventional amounts, various other constituents conventionally included in known mastic compositions for purposes such as rubber antioxidants, and the like.

The mastic adhesive composition of the invention, for each 100 parts by weight of its reclaim rubber component, contains from 50 to 200 parts by weight of a rosin pot residue or its zinc salt or glycol polyester. This rosin pot residue or its zinc salt or glycol polyester constituent functions to provide the mastic composition with adequate adhesive tack. Preferably it is included in an amount between 100 and 175 parts by weight for each 100 parts by weight of the reclaim rubber. In general, rosin pot residue consists essentially of a mixture of dimeric monobasic acids of a less than about five percent anhydride content and is the dimeric residue remaining after stripping of volatiles and rosin from heat-treated gum rosin or heat treated wood rosin. Generally the rosin pot residue has a B & R softening point between 100° to 150° C., a neutral equivalent between 470 and 1785, a saponification equivalent between 343 and 482, and a molecular weight between 695 and 740. Generally its heat-treatment preparation involves a temperature between about 220° C. and 330° C. under an inert gas blanket for from a few minutes up to 90 hours or longer. Yields of rosin pot residue up to about 35 percent, based on the starting rosin, are obtainable depending on the particularly employed time and temperature heat-treatment parameters. Generally the longer times are necessary at the lower temperatures to provide those yields obtainable with shorter times at the higher temperatures. Stripping of volatiles and rosin from the heat-treated rosin intermediate produce may be by conventional means. Generally the stripping is by vacuum distillation, such as at 260° C. and 20 mm. Hg to remove volatiles and at 280° C. and 3 mm. Hg to remove rosin, or by steam distillation between about 260° C. and 310° C.

The zinc salt of the rosin pot residue generally is a zinc salt from reaction of the rosin pot residue with a stoichiometric amount of a zinc reactant, such as zinc carbonate or zinc oxide or like zinc reactant, at a temperature between 250° C. to 300° C. for several hours. Smaller amounts of zinc reactant may be used with only a partial conversion of the rosin pot residue to its zinc salt with the resulting product mixture also being useful in the mastic compositions of the invention.

The glycol polyester of the rosin pot residue is a polyester from reaction of a polyol, such as diethylene glycol or pentaerythritol or like polyol, through esterification and trans-esterification at temperatures generally between 200° C. to 325° C. until esterification is complete. Generally the polyol reactant is utilized in an amount sufficient to react with all the carboxylic acid present. Use of a smaller amount of glycol is possible with the resulting product then being a mixture of rosin pot residue and its polyester with this resulting product mixture also being useful in the mastic composition of the invention. In addition to pentaerythritol and diethylene glycol as useful polyols for preparation of the polyester, other useful glycol reactants include propylene glycol, ethylene glycol, glycerol, and the like polyols. Desirably the esterification reaction also is carried forth under an inert gas blanket or the like to provide a polyester of better color grade.

The rosin pot residue and its zinc salt and glycol polyester will be more fully understood from the description thereof in "Thermal Dimerization of Rosin" by B. A. Parkin et al. (Ind. & Eng. Chem., Prod. Res. & Dev., 8 304–306 [1969]) and U.S. patent application entitled "Process for the Preparation of New or Improved Products From Rosin" by B. A. Parkin, Jr., W. H. Schuller, and R. V. Lawrence, filed on Oct. 10, 1969, Ser. No. 865,321, and the several illustrative preparations thereof which follow.

ILLUSTRATIVE PREPARATIONS OF ROSIN POT RESIDUE

Example A

Two hundred grams of gum rosin of Acid No. 168 are placed in a pot and while under a blanket of carbon dioxide gas, heated to 300° C. within one hour and maintained with stirring at that temperature for 0.5 hours. At this time the pot temperature is lowered and vacuum distillation commenced. A forecut is removed at a pot temperature of 260° C. at 20 mm. of Hg pressure, and a rosin cut is taken at a pot temperature of 280° C. at 3 mm. of Hg pressure. The residue, about 24 percent yield, is the rosin pot residue and, after cooling to 200° C., is poured. The resulting rosin pot residue is found to have a B & R softening point of 138° C., a neutral equivalent of 714, a saponification equivalent of 443, and a molecular weight of 700.

Example B

Two hundred grams of wood rosin are placed in a pot and, while under a blanket of carbon dioxide gas, heated to 300° C. within one hour and maintained with stirring at that temperature for one hour. At this time the pot temperature is lowered and vacuum distillation commenced. A forecut is removed at a pot temperature of 260° C. at 20 mm. of Hg pressure, and a rosin cut is taken at a pot temperature of 280° C., at 3 mm. of Hg pressure. The residue, about 15 percent yield, is the rosin pot residue and, after cooling to 200° C., is poured. The resulting rosin pot residue is found to have a B & R softening point of 111° C., a neutral equivalent of 720, and a molecular weight of 665.

Example C

Example A is repeated, except in place of vacuum distillation thereof for stripping volatiles and rosin therefrom, the volatiles and rosin are stripped from the heated rosin by steam distillation at 280° C. Yield is 5 percent of a rosin pot residue having a B & R softening point of 137° C., and a neutral equivalent of 578.

Example D

Two hundred grams of tall oil rosin are placed in a pot and blanketed with $CO_2$ gas while heating to 315° C. The charge was maintained at 315° C. for 0.5 hours. Vacuum was then applied slowly and distillation commenced. The first cut was the rosin cut taken to a pot temperature of 280° at 3 mm. due to the absence of any appreciable low boiling components. The residue 6.4% is found to have B & R softening point of 106° C., a neutral equivalent of 1785, saponification equivalent of 410, and a molecular weight of 725.

ILLUSTRATIVE PREPARATION OF ZINC SALT OF ROSIN POT RESIDUE

Example E 700 grams (i.e., 0.7 mole) of rosin pot residue, having a neutral equivalent of 1008, is placed in a 1-liter flask and heated to 250° to 260° C. Zinc carbonate in an amount of 43.9 grams (i.e., 0.35 mole) is added slowly with stirring. After the addition is completed, the temperature is raised to 275° C. for two hours. Almost all of the zinc carbonate dissolves. The batch then is cooled to 200° C. and poured. The resulting zinc salt is of a color grade of H (U.S. Rosin Standard) and has a B & R softening point of 148° C.

ILLUSTRATIVE PREPARATION OF PENTAERYTHRITOL ESTER OF ROSIN POT RESIDUE

Example F 800 grams (i.e., 0.795 mole) of rosin pot residue having a neutral equivalent of 1008, is mixed with thirty-six grams (i.e., 0.265 mole) of pentaerythritol and heated to 285° C. under a light carbon dioxide until water ceases to separate. An additional 3.5 grams (i.e., 0.026 mole) of pentaerythritol is added and heating continued at 285° C. until no further water is obtained. The batch then is cooled to 200° C. and poured. The resulting ester is of a color grade of H (U.S. Rosin Standard) and has a B & R softening point of 137° C.

ILLUSTRATIVE PREPARATION OF DIETHYLENE GLYCOL ESTER OF ROSIN POT RESIDUE

Example G 200 grams (i.e., 0.1987 mole) of rosin pot residue, having a neutral equivalent of 1008, is mixed with 10.52 grams (i.e., 0.994 mole) of diethylene glycol and heated to 225° C. Sufficient benzene is added to fill the water trap and give reflux. Heating then is continued until water ceases to separate. The batch then is cooled to 200° C. and poured. The resulting ester is of a color grade of K (U.S. Rosin Standard) and has a B & R softening point of 134° C.

Formulations 1, 2, and 3

There are prepared the following basic formulations containing reclaim rubber from gray carcass scrap, which reclaim rubber contained about 66 percent rubber hydrocarbon and 33 percent ash and had a specific gravity of 1.25, such as Naugatuck Reclaimed Rubber No. 662.

|  | 1 | 2 | 3 |
|---|---|---|---|
| Parts by weight of rosin pot residue or its zinc salt or glycol polyester per 100 parts by weight of rubber | 125 | 150 | 175 |
| Ingredients (parts by weight): |  |  |  |
| Reclaim rubber | 17.50 | 16.39 | 15.52 |
| Rosin pot residue or its zinc salt or glycol polyester | 21.88 | 24.69 | 27.17 |
| Filler: |  |  |  |
| Kaolin clay (s.g. 2.6, −300 mesh) such as Dixie Clay | 8.79 | 8.23 | 7.70 |
| Precipitated calcium carbonate, fine particle size, such as Calcene TM | 8.79 | 8.23 | 7.70 |
| Asbestos fiber, such as Asbestos 7T06 | 8.79 | 8.23 | 7.70 |
| Rubber antioxidant phenyl beta naphthylamine | 0.25 | 0.24 | 0.23 |
| Rubber vehicle: |  |  |  |
| Tolune | 15.30 | 15.30 | 15.30 |
| n-Hexane | 18.70 | 18.70 | 18.70 |

In preparing the formulations of Formulations 1, 2, and 3, there is used a Bramley Beken duplex mixer which can be heated using steam and cooled using cold water. Its mixing blades are driven by a variable-speed motor drive adjustable to provide 16.5 to 84 r.p.m. The mixer is heated to 230° F. after reaching temperature, the reclaim rubber is added and allowed to masticate for 15 minutes, first at 33 and later at 84 r.p.m. Next the particular rosin pot residue or its zinc salt or glycol polyester is added. After 15 minutes of mixing, the mill is cooled to 190° F. The speed of the mill then is reduced to 50 r.p.m. and the clay filler added slowly. After 15 minutes mixing, the mill is cooled to 175° F.; and the mill speed reduced to 33 r.p.m. and the calcium carbonate filler and the rubber antioxidant are added slowly to the batch. After 5 minutes mixing, the toluene is added slowly over an 8–10 minute period. The mill is cooled to 100° F., at which time the asbestos filler is added. After 10 minutes of mixing, the n-hexane is added slowly. Mill speed then is increased to 50 r.p.m.; and upon completion of solvent addition, the composition is allowed to mix for an additional 5 minutes. At this time a small sample of the batch is taken and a solids determination is made rapidly thereof. Additional rubber vehicle then is added, if necessary, to provide a formulation approximating 66 percent solids content.

To illustrate utility of and advantageous properties exhibited by the foregoing illustrative embodiments of mastic adhesive compositions of the invention, they are utilized to adhere plywood surfaces together and a number of physical properties thereof are determined. For comparison therewith, there also are prepared in a like manner the same formulations except that an equal amount by weight of WW wood rosin or a pentaerythritol ester of hydrogenated rosin, such as Pentalyn H of Hercules Powder Company, replaces the rosin pot residue or its zinc salt or glycol polyester component thereof.

The following Tables I through V present illustrative physical property data from employing a number of the foregoing embodiments of the invention along with corresponding data from employing a comparison formulation. In preparing adhered specimens for this data determination, mastic composition is applied by a ⅛ x ½ x ⅛-inch notched-trowel to a surface of each of two fir (Grade AB) plywood blocks in a manner to provide a cross-hatch of material when the plywood blocks are assembled. These plywood blocks before application of mastic composition were stored for two weeks at 73° F. under a relative humidity of fifty percent. For lap-shear strength determinations, an area of 2 x 1½-inch on each of two 2 x 1¾ x ¾-inch blocks is coated and two blocks assembled during the open time of the mastic composition; following which a 500-g. weight is set on the assembled blocks for 30 minutes before exposing the assembled blocks for 2 weeks at 73° F. and a relatively humidity of 50 percent; and then determining their lap-shear strength. Lap-shear strength determinations are as outlined in ASTM Method D905–49 except that the Instrom rate is 0.5-inch per minute and the number of test specimens for each composition is two. For lap-shear strength after aging, correspondingly prepared specimens immediately after assembly are stored in an oven for two weeks at 70° C. For resistance to embrittlement after aging determinations, data obtainable during lap-shear strength determinations are used. With chart speed set at the same rate as jaw speed, values measured in inches along the base of each bond-strength curve are a measure of the elongation or deformation of the mastic while being sheared apart during the lap-shear strength test. In resistance to static load determinations, a 1-inch$^2$ area of each of two 1 x 5 x ¼-inch blocks is coated with the mastic compositions; two blocks are assembled during the open time of the mastic following which a 500 g. weight is set on the assembled blocks for 30 minutes; and then the assembled blocks are conditioned for two weeks at 73° F. and a relative humidity of 50 percent before testing. In testing the specimens are hung vertically in a forced-air oven at 160° F. and a 500 g. weight attached to the bottom of the 9-inch long assembled specimens. For green-tack strength determinations, corresponding specimens are prepared and their adhered strengths determined following their assembly and following their having a 500 g. weight set on them for thirty seconds. In open time determinations, the mastic composition is applied lengthwise onto two 1 x 5 x ¼-inch plywood blocks and then brought together with the mastic sides facing in cross-lap fashion at various time intervals thereafter up to a time interval at which it was observed that the applied mastic compositions had no tack. The time just before that at which no tack is observed is recorded as open time.

TABLE I.—LAP-SHEAR STRENGTH

|  |  | Adhesion, p.s.i. | |
|---|---|---|---|
|  | Conc., phr.[a] | Before aging | After aging 2 wks. at 158° F. |
| Control of WW wood resin in— |  |  |  |
| Formulation 1 | 125 | 101 | 160 |
| Formulation 2 | 150 | 96 | 164 |
| Formulation 3 | 175 | 104 | >158 |
| Control of pentaerythritol ester of hydrogenated rosin in— |  |  |  |
| Formulation 1 | 125 | 47 | 60 |
| Formulation 2 | 150 | 46 | 81 |
| Formulation 3 | 175 | 48 | 146 |
| Rosin pot residue of Example A in— |  |  |  |
| Formulation 1 | 125 | 232 | 232 |
| Formulation 2 | 150 | 240 | 138 |
| Formulation 3 | 175 | 176 | 134 |
| Zinc salt of Example E in— |  |  |  |
| Formulation 1 | 125 | 143 | 127 |
| Formulation 2 | 150 | 166 | 115 |
| Formulation 3 | 175 | 200 | 170 |
| Pentaerythritol ester of Example F in— |  |  |  |
| Formulation 1 | 125 | 198 | 117 |
| Formulation 2 | 150 | 232 | 120 |
| Formulation 3 | 175 | 254 | 105 |

[a] Parts per hundred by weight, based on the reclaim rubber, of the included amount of the WW wood rosin or pentaerythritol ester in the control formulations and of the included amount of the designated rosin pot residue, zinc salt, or pentaerythritol ester of the designated formulations.

TABLE II.—EMBRITTLEMENT AS PERCENT DEFORMATION

| | Conc., phr.[a] | Percent deformation [b] |
|---|---|---|
| Control of pentaerythritol ester of hydrogenated rosin in— | | |
| Formulation 1 | 125 | 48 |
| Formulation 2 | 150 | 58 |
| Formulation 3 | 175 | 54 |
| Rosin pot residue of Example A in— | | |
| Formulation 1 | 125 | 69 |
| Formulation 2 | 150 | 80 |
| Formulation 3 | 175 | 44 |
| Zinc salt of Example D in— | | |
| Formulation 1 | 125 | 86 |
| Formulation 2 | 150 | 80 |
| Formulation 3 | 175 | 54 |
| Pentaerythritol ester of Example F in— | | |
| Formulation 1 | 125 | 53 |
| Formulation 2 | 150 | 97 |
| Formulation 3 | 175 | 38 |

[a] Parts per hundred by weight, based on the reclaim rubber, of the included amount of the pentaerythritol ester of hydrogenated rosin in the control formulations and of the included amount of the designated rosin pot residue, zinc salt, or pentaerythritol ester in the designated formulations.
[b] Percent deformation is calculated by dividing the average elongation (in inches) of specimens aged at room-temperature (2 weeks at 73° F.) into the average elongation value (in inches) of specimens aged 2 weeks at 158° F. and then multiplying by one hundred.

TABLE III.—RESISTANCE TO STATIC LOAD AT ELEVATED TEMPERATURE

| | Conc., phr.[a] | Hours, time [b] |
|---|---|---|
| Control of WW wood rosin in— | | |
| Formulation 1 | 125 | 1.1 |
| Formulation 2 | 150 | 0.6 |
| Formulation 3 | 175 | 0.3 |
| Control of pentaerythritol ester of hydrogenated rosin in— | | |
| Formulation 1 | 125 | >24 |
| Formulation 2 | 150 | 1 |
| Formulation 3 | 175 | 0.3 |
| Rosin pot residue of Example A in— | | |
| Formulation 1 | 125 | >24 |
| Formulation 2 | 150 | >24 |
| Formulation 3 | 175 | >24 |
| Zinc salt of Example E in— | | |
| Formulation 1 | 125 | >24 |
| Formulation 2 | 150 | >24 |
| Formulation 3 | 175 | >24 |
| Pentaerythritol ester of Example F in— | | |
| Formulation 1 | 125 | >24 |
| Formulation 2 | 150 | >24 |
| Formulation 3 | 175 | >24 |

[a] Parts per hundred by weight, based on the reclaim rubber, of the included amount of the WW wood resin or pentaerythritol ester in the control formulations and of the included amount of the designated rosin pot residue, zinc salt, or pentaerythritol ester in the designated formulations.
[b] Time to failure at 160° F. under load of 500 grams per square inch of lap joint.

TABLE IV.—OPEN TIME

| | Conc., phr.[a] | Hours, time [b] |
|---|---|---|
| Control of pentaerythritol ester of hydrogenated rosin in— | | |
| Formulation 2 | 150 | 30 |
| Formulation 3 | 175 | 45 |
| Rosin pot residue of Example A in— | | |
| Formulation 1 | 125 | 15 |
| Formulation 2 | 150 | 15 |
| Formulation 3 | 175 | 35 |
| Zinc salt of Example E in— | | |
| Formulation 1 | 125 | 3 |
| Formulation 2 | 150 | 5 |
| Formulation 3 | 175 | 5 |
| Pentaerythritol ester of Example F in— | | |
| Formulation 1 | 125 | 5 |
| Formulation 2 | 150 | 5 |
| Formulation 3 | 175 | 15 |

[a] Parts per hundred by weight, based on the reclaim rubber, of the included amount of the pentaerythritol ester of hydrogenated rosin in the control formulations and of the included amount of the designated rosin pot residue, zinc salt, or pentaerythritol ester in the designated formulations.
[b] The useful time interval between the spreading of the mastic composition on the adherend and the completion of the mating of the parts for bonding wherein the spread mastic composition has useful tack. Just beyond the recorded time interval the applied composition no longer has adequate green tack for adhesive purposes.

TABLE V.—GREEN-TACK STRENGTH

| | Conc., phr.[a] | Adhesion, p.s.i.[b] |
|---|---|---|
| Control of pentaerythritol ester of hydrogenated rosin in— | | |
| Formulation 1 | 125 | 1.2 |
| Formulation 2 | 150 | 1.4 |
| Formulation 3 | 175 | 1.1 |
| Rosin pot residue of Example A in— | | |
| Formulation 1 | 125 | 0.8 |
| Formulation 2 | 150 | 0.5 |
| Formulation 3 | 175 | 0.7 |
| Zinc salt of Example E in— | | |
| Formulation 1 | 125 | 0.5 |
| Formulation 2 | 150 | 0.4 |
| Formulation 3 | 175 | 0.6 |
| Pentaerythritol ester of Example F in— | | |
| Formulation 1 | 125 | 0.8 |
| Formulation 2 | 150 | 0.6 |
| Formulation 3 | 175 | 0.5 |

[a] Parts per hundred by weight, based on the reclaim rubber, of the included amount of the pentaerythritol ester of hydrogenated rosin in the control formulations and of the included amount of the designated rosin pot residue, zinc salt, or pentaerythritol ester in the designated formulations.
[b] Tack of composition shortly after troweling on plywood surfaces and before expiration of the open time interval whereafter the applied composition no longer has significant green tacks.

We claim:

1. A mastic adhesive composition comprising relative proportions by weight of:
    (a) 100 parts of reclaim rubber;
    (b) 50 to 200 parts of a rosin pot residue selected from the group consisting of heat-treated gum rosin pot residue, heat-treated wood rosin pot residue, and heat-treated tall oil pot residue, which selected rosin pot residue in any case is the mixture of dimeric monobasic acids of less than 5 percent anhydride content remaining after stripping of volatiles and rosin;
    (c) a hydrocarbon vehicle in an amount dispersing the reclaim rubber and providing the mastic adhesive composition with a solids content between 40 and 80 percent.

2. The composition of claim 1 wherein the rosin pot residue is heat-treated gum rosin pot residue.

3. The composition of claim 1 wherein the rosin pot residue is heat-treated wood rosin pot residue.

4. The composition of claim 1 wherein the rosin pot residue is heat-treated tall oil rosin pot residue.

5. A mastic adhesive composition comprising relative proportions by weight of:
    (a) 100 parts of reclaim rubber;
    (b) 50 to 200 parts of the zinc salt of a rosin pot residue selected from the group consisting of heat-treated gum rosin pot residue, heat-treated wood rosin pot residue, and heat-treated tall oil rosin pot residue, which selected zinc salt rosin pot residue in any case is the zinc salt mixture of dimeric monobasic acids of less than 5 percent anhydride content remaining after stripping of volatiles and rosin;
    (c) a hydrocarbon vehicle in an amount dispersing the reclaim rubber and providing the mastic adhesive composition with a solids content between 40 and 80 percent.

6. The composition of claim 5 wherein the zinc salt of a rosin pot residue is the zinc salt of heat-treated gum rosin pot residue.

7. The composition of claim 5 wherein the zinc salt of a rosin pot residue is the zinc salt of heat-treated wood rosin pot residue.

8. The composition of claim 5 wherein the zinc salt of a rosin pot residue is the zinc salt of heat-treated tall oil rosin pot residue.

9. A mastic adhesive composition comprising relative proportions by weight of:
    (a) 100 parts of reclaim rubber;
    (b) 50 to 200 parts of the glycol polyester of a rosin pot residue selected from the group consisting of heat-treated gum rosin pot residue, heat-treated wood rosin pot residue, and heat-treated tall rosin pot residue, which selected glycol polyester of a rosin pot residue in any case is the mixture of dimeric monobasic acids of less than 5 percent anhydride content remaining after stripping of volatiles and rosin;

(c) a hydrocarbon vehicle in an amount dispersing the reclaim rubber and providing the mastic adhesive composition with a solids content between 40 and 80 percent.

10. The composition of claim 9 wherein the glycol polyester of a rosin pot residue is the glycol polyester of heat-treated gum rosin pot residue.

11. The composition of claim 9 wherein the glycol polyester of a rosin pot residue is the glycol polyester of heat-treated wood rosin pot residue.

12. The composition of claim 9 wherein the glycol polyester of a rosin pot residue is the glycol polyester of heat-treated tall oil rosin pot residue.

References Cited

FOREIGN PATENTS 554,447  7/1943  Great Britain _____ 260—2.3

OTHER REFERENCES

Berry et al., ACS 157th meeting, April 1969, pp. 264–277.

Parkin et al., "I&EC Product Research and Development," vol. 8, No. 3, September 1969, pp. 304–306.

SAMUEL H. BLECH, Primary Examiner

U.S. Cl. X.R.

156—334; 161—250; 260—27 BB, 97, 97.5, 104, 105, 106, 732, 755